United States Patent
Noguchi

(10) Patent No.: US 7,523,313 B2
(45) Date of Patent: Apr. 21, 2009

(54) IMAGE DATA MANAGEMENT APPARATUS

(75) Inventor: Yukinori Noguchi, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 883 days.

(21) Appl. No.: 10/602,671

(22) Filed: Jun. 25, 2003

(65) Prior Publication Data
US 2004/0010693 A1     Jan. 15, 2004

(30) Foreign Application Priority Data
Jun. 25, 2002     (JP)     ............................. 2002-184311

(51) Int. Cl.
*H04L 9/00*     (2006.01)
(52) U.S. Cl. ........................... 713/176; 726/30; 726/31; 726/32; 726/33; 713/168; 382/305; 380/201; 380/203; 380/239
(58) Field of Classification Search ................. 713/176
See application file for complete search history.

(56) References Cited

U.S. PATENT DOCUMENTS

| | | | | |
|---|---|---|---|---|
| 5,649,185 | A * | 7/1997 | Antognini et al. ............... | 707/9 |
| 5,768,505 | A * | 6/1998 | Gilchrist et al. ............. | 709/201 |
| 5,771,355 | A * | 6/1998 | Kuzma ........................ | 709/232 |
| 5,903,723 | A * | 5/1999 | Beck et al. ................... | 709/200 |
| 6,385,596 | B1 * | 5/2002 | Wiser et al. .................... | 705/51 |
| 6,473,859 | B1 * | 10/2002 | Enokida ..................... | 713/164 |
| 6,557,102 | B1 * | 4/2003 | Wong et al. .................. | 713/176 |
| 6,757,827 | B1 * | 6/2004 | Geist .......................... | 713/176 |
| 7,035,830 | B1 * | 4/2006 | Shaikh ......................... | 705/52 |
| 7,046,817 | B2 * | 5/2006 | Kamijoh et al. ............. | 382/100 |
| 2004/0066533 | A1 | 4/2004 | Nakjima | |

FOREIGN PATENT DOCUMENTS

| | | |
|---|---|---|
| EP | 1047269 | 10/2000 |
| JP | 2000-172566 | 6/2000 |
| JP | 2000-308038 A | 11/2000 |
| JP | 2001-118330 | 4/2001 |
| JP | 2001-359037 | 12/2001 |
| JP | 2002-314935 | 10/2002 |

OTHER PUBLICATIONS

Tsolis1, D., et al, 'A New Platform for Watermarking and Management of Digital Images of the Hellenic Cultural Heritage', IEEE, 2002, 0-7803-7503-3/02, entire document, http://www.upatras.gr/ieee/skodras/pubs/ans-c44.pdf.*

* cited by examiner

*Primary Examiner*—Kambiz Zand
*Assistant Examiner*—Ronald Baum
(74) *Attorney, Agent, or Firm*—Birch, Stewart, Kolasch & Birch LLP

(57) ABSTRACT

Property information of image data sets managed in an image data management apparatus can be dealt with according to a characteristic thereof, while efficiency of use can be improved. Image ID is issued for each of the image data sets uploaded by a user. Property information A and B is respectively obtained by analysis of the image data sets and by an input from the user. The user can set a security processing method and a storage method for each of items of the property information. The items of the property information whose storage method has been set to image data attachment are attached to the image data sets while the remaining items whose storage method has been set to database storage are separately stored together with the image ID, after the security processing according to the security processing method.

4 Claims, 8 Drawing Sheets

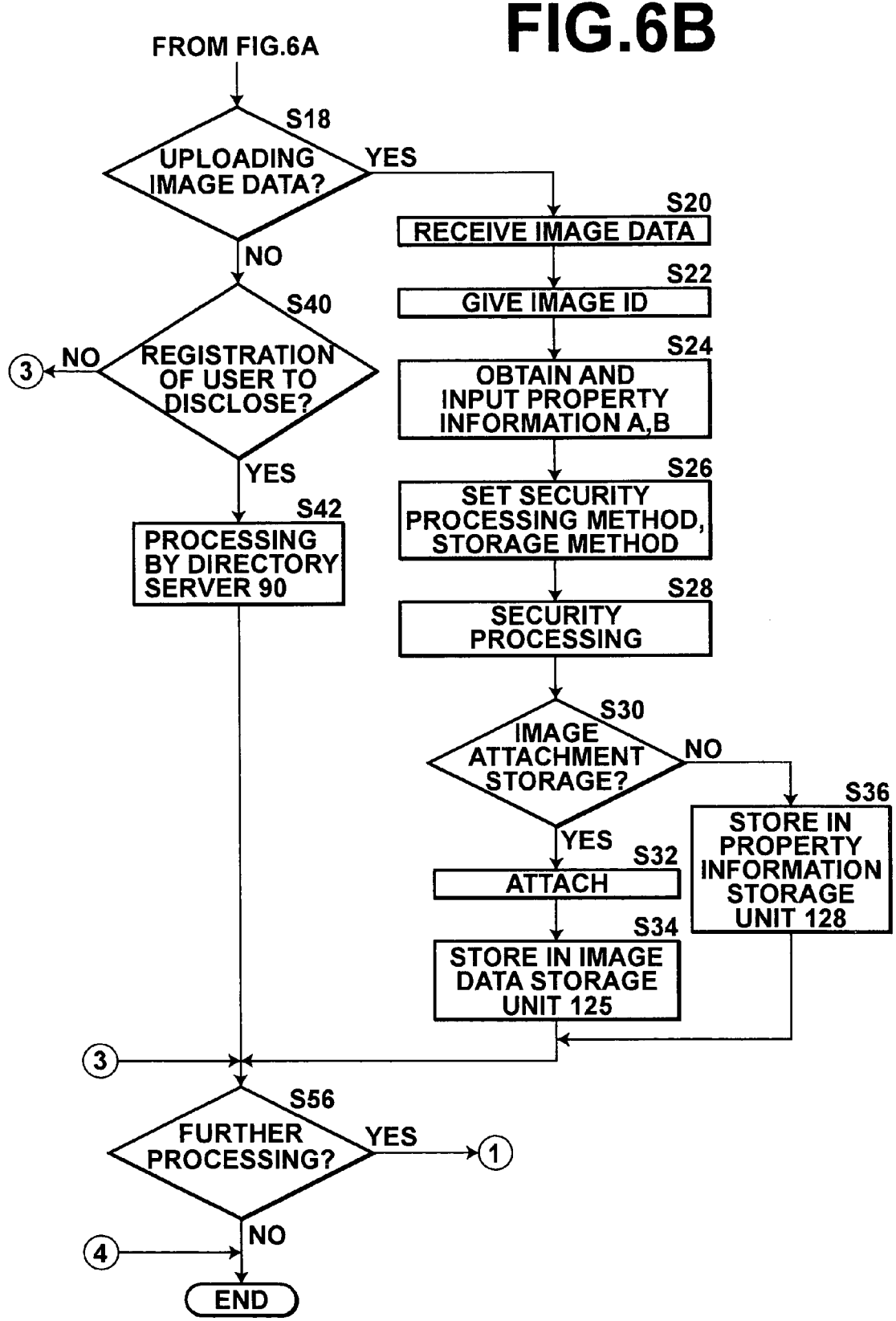

IMAGE DATA MANAGEMENT APPARATUS

BACKGROUND OF THE INVENTION

1. Field of the Invention

The present invention relates to an apparatus for managing image data.

2. Description of the Related Art

Before the spread of digital cameras, prints generated from silver salt photographic films were used dominantly, and such prints are still used in various manners. For example, prints are used for confirming how photographs look, for communication with friends by viewing them together, for sending additional prints to friends, for display by enlargement, and for generating photograph albums. However, such prints simply accumulate if the prints are not organized in a proper manner. In the case where some of prints or negatives are lost, proper arrangement thereof becomes difficult. In addition, classification according to themes is a time-consuming task. Even in the case where prints have been organized, some of the prints or negatives may be taken out and not returned. Therefore, maintaining the prints in an arranged state is difficult.

For this reason, photograph images are stored as digital data by reading images recorded on negatives with a scanner or by using image data obtained by a digital camera. However, such digital image data are often stored in a hard disc of a personal computer owned by a user, and moving the image data is a troublesome operation in the case where the user purchases a new computer. In some cases, image data are stored in a recording medium such as a CD-R. However, the recording medium itself can degrade, and the image data may be lost during long-term data storage. Furthermore, an apparatus for reproducing image data in a specific recording medium may become unavailable due to the technology becoming obsolete. In this case, reproduction of the image data itself cannot be carried out.

Therefore, an image storage system has been proposed for providing a service of storing image data sets in an image storage server by sending the image data sets via a network such as the Internet. In some cases, the image storage system can even improve image quality by carrying out image processing such as automatic set-up processing on the image data sets stored therein.

In the image storage system, property information, comprising items such as the date of photography, a parameter for the automatic set-up processing, and color information, is usually stored attached to the image data sets. A user can access the image storage server via a terminal such as a personal computer, and can view the image data sets or search for a desired one of the image data sets with use of the property information as a keyword.

However, searching for a desired one of the image data sets is difficult if the property information alone is used as the keyword. Consequently, an image storage system enabling a search according to information on a photographer or a subject (such as the name of a person in the case where the subject is the person) or a photography location has been desired, and the information described above needs to be incorporated as the property information.

Meanwhile, the image data sets stored in the image storage system described above are assumed to be used by a number of people. However, an owner of the image data sets may not wish to disclose the property information or wish to disclose the property information only to a limited number of people, since the property information on the photographer or the subject is related to privacy, although the information that can be extracted from the image data sets, such as the information on the date of photography or color, can be open to public.

Moreover, in the conventionally used image storage system, the property information is described in tag information of the image data sets. Therefore, an increase in data size of each of the image data sets cannot be avoided if an amount of the property information becomes large. However, although a user of the image data sets does not necessarily wish to have all the items of the property information, all the property information is downloaded at the time he/she downloads the image data sets. Consequently, downloading becomes a time-consuming and inefficient operation.

SUMMARY OF THE INVENTION

The present invention has been conceived based on consideration of the above circumstances. An object of the present invention is therefore to provide an image data management apparatus that enables distinctive handling of property information regarding image data sets according to a characteristic of the property information and aims to improve efficiency in use.

An image data management apparatus of the present invention comprises:

property information obtaining means for obtaining property information of an image data set to be managed;

security processing method setting means for setting a security processing method for each of items of the property information;

security processing means for carrying out security processing on each of the items of the property information according to the security processing method that has been set;

attachment means for attaching the property information having been subjected to the security processing to the image data set; and image data storage means for storing the image data set attached with the property information.

The image data set refers to not only an image data set representing a still image but also an image data set representing a moving image.

The items of the property information may comprise items that can be obtained from the image data set, such as the date of photography and color information. Alternatively, the items of the property information may include items that cannot be obtained from the image data set, such as a parameter of automatic set-up processing carried out on the image data sets, the name of a photographer, subject information, and a photography location. In addition, a predetermined keyword and a comment on the image data set can be included in the items of the property information.

The property information obtaining means is a means for inputting the items of the property information to the image data management apparatus. For example, the property information obtaining means may be image analysis means for extracting the date of photography and the color information from the image data set, or input means for inputting the items of the property information such as the name of photographer or the subject information that cannot be extracted from the image data set.

It is preferable for the image data management apparatus of the present invention to further comprise:

attachment decision means for setting whether each of the items of the property information is attached to the image data set; and property information storage means for storing the item or items of the property information that have been decided to be not attached, in relation to the image data set. In this case, the attachment means attaches only the remaining items of the property information that have been decided to be attached.

The image data management apparatus of the present invention sets the security processing method for each of the items of the property information of the image data set, and the security processing is carried out on the items of the property information according to the security processing method that has been set. The security processing method refers to encryption processing or electronic watermark processing, for example. In addition, the security processing method includes not carrying out security processing if the corresponding item or items of the property information do not require high security.

The image data storage means and the property information storage means in the image data management apparatus of the present invention may be installed separately but connected to each other via a network.

In the image data management apparatus of the present invention, it is preferable for the property information to include an item representing a parameter of image processing to be carried out on the image data set. In this case, the image data set is preferably an original image data set that has not been subjected to any image processing.

According to the image data management apparatus of the present invention, the security processing method can be set for each of the items of the property information of the image data set to be managed. The security processing is carried out according to the security processing method on the respective items of the property information, and the property information whose items have been subjected to the security processing can be attached to the image data sets. Therefore, only the item or items of the property information that require high security due to consideration of privacy, such as the information on photographer and subject, can be processed by the security processing method aiming for high security. In this manner, the item or items of the property information can be viewed by only a specific user or specific application software in order to protect privacy, while the property information can be provided in various manners.

Furthermore, a search for the image data set according to the property information as a keyword can be convenient, as the items included in the property information are enriched.

By installing the attachment decision means and the property information storage means in the image data management apparatus of the present invention, only the item or items of the property information that the attachment decision means has set to be attached to the image data set are attached to the image data set while the remaining item or items of the property information that the attachment decision means has set to be not attached are stored in the property information storage means. Therefore, when a user downloads the image data set, the user does not need to download the item or items of the property information stored in the property information storage means if the item or items are unnecessary. Therefore, the time for downloading can be shortened, which is efficient.

BRIEF DESCRIPTION OF THE DRAWINGS

FIG. 6A, FIG. 6B and FIG. 6C show a flow chart illustrating the operation of the photo bank 100.

DESCRIPTION OF THE PREFERRED EMBODIMENT

Hereinafter, an embodiment of the present invention will be explained with reference to the accompanying drawings.

Figure 1:
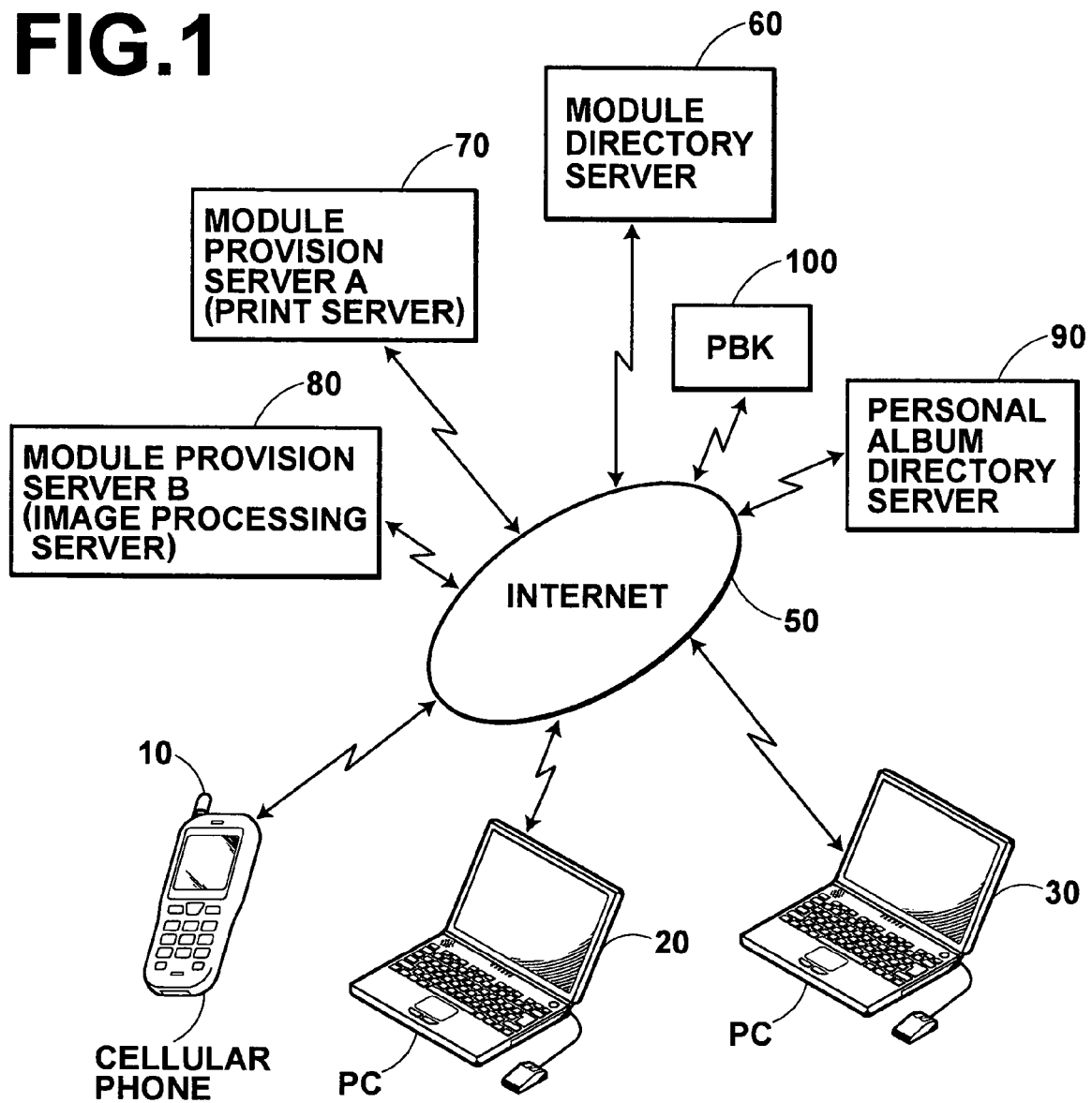
FIG. 1 is a block diagram showing a configuration of a photograph image service system adopting an embodiment of an image data management apparatus of the present invention.

FIG. 1 is a block diagram showing a configuration of a photograph image service system adopting an image data management apparatus of the present invention. As shown in FIG. 1, the photograph image service system comprises a cellular phone 10, personal computers 20 and 30, a module provision server A (a print server 70), a module provision server B (an image processing server 80), a module directory server 60, a photograph image data management server 100 (shown as PBK 100 in FIG. 1 and hereinafter referred to as the photo bank 100), and a personal album directory server 90. The cellular phone 10 and the personal computers 20 and 30 act as terminals. The print server 70 provides a printing service module for printing photograph image data sets. The image processing server 80 provides an image processing service module for carrying out image processing on the photograph image data sets. The module directory server 60 manages information regarding which of the servers provides which of services. The photo bank 100 manages the photograph image data sets uploaded from the terminals 10, 20, and 30, in the form of photograph albums owned by users (owners). The personal album directory server 90 manages information representing who can access the photograph albums disclosed by the owners of the photograph image data sets stored in the photo bank 100. The terminals and the servers are connected to each other via the Internet 50. The photo bank 100, the print server 70, and the image processing server 80 provide the services to the terminals via Web interfaces. In order to simplify the explanation below, details of Web pages will not be specifically explained.

Figure 2:
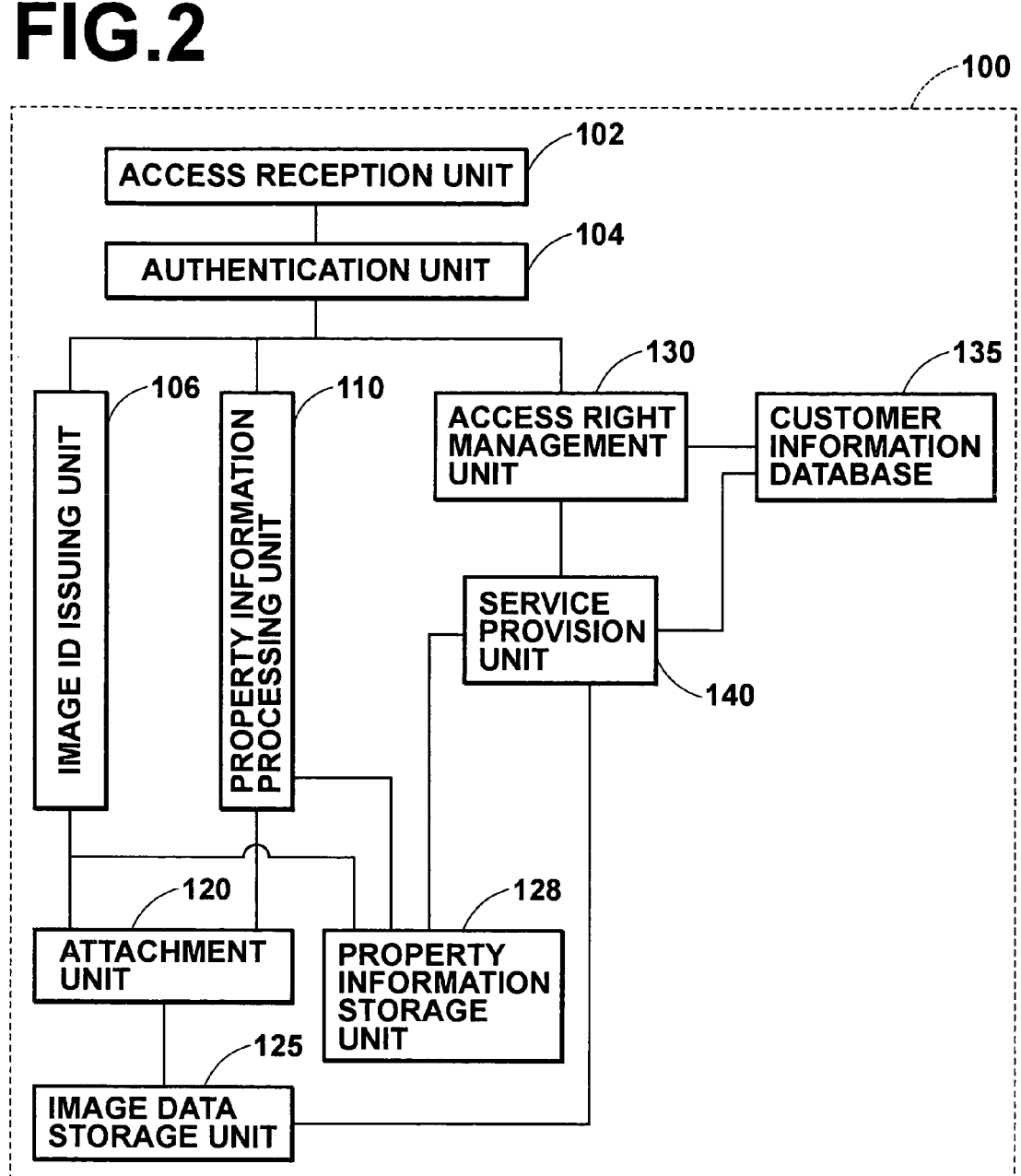
FIG. 2 is a block diagram showing a configuration of a photo bank 100 as the embodiment of the image data management apparatus installed in the photograph image service system shown in FIG. 1.

FIG. 2 is a block diagram showing a configuration of the photo bank 100 as the embodiment of the image data management apparatus of the present invention. As shown in FIG. 2, the photo bank 100 comprises an access reception unit 102, an authentication unit 104, an image ID issuing unit 106, a property information processing unit 110, an attachment unit 120, an image data storage unit 125, a property information storage unit 128, an access right management unit 130, a service provision unit 140, and a customer information database 135. The access reception unit 102 receives access from a user via his/her terminal such as the cellular phone 10 or the personal computer 20 or 30. The authentication unit 104 causes the user to register himself/herself by inputting the name and a password of the user, in the case where the user is accessing the photo bank 100 for the first time. The authentication unit 104 also prompts the user to input the name and the password of the user for user authentication, in the case where user registration of the user has been completed. The image ID issuing unit 106 gives unique image ID's to each of the photograph image data sets (hereinafter referred to as the image data sets) in the case where the user is accessing the photo bank 100 for uploading the image data sets as the owner thereof. The property information processing unit 110 (which will be explained later in detail) obtains property information of each of the image data sets, causes the owner to determine a security processing method and a storage method for each of items of the property information, and processes the items of the property information according to the processing methods. The attachment unit 120 attaches to the corresponding image data sets the property information having only the item or items that the property information processing unit 110 has processed and set to be attached to the image data sets (hereinafter referred to as image attachment items). The image data storage unit 125 stores, in the form of a photograph album of the owner, the image data sets attached with the image attachment items of the property information and having the corresponding image ID given by the image ID issuing unit 106. The property information storage unit 128 stores for the owner the remaining item or items of the property information which have been processed and set to be not attached to the image data sets by the property information processing unit 110 (hereinafter referred to as database storage items), in relation to the corresponding image ID. The access right management unit 130 confirms whether the user in access has an access right to the image data sets stored in the image data storage unit 125 and to the property information stored in the property information storage unit 128, in addition to the type of the image access right if the user has the access right. The access right management unit 130 also denies access by the user in the case where the user does not have the access right but is trying to access the image data sets that are stored in the image data storage unit 125. The service provision unit 140 provides the services according to the type of the access right of the user. The customer information database 135 stores information such as the name and the address of each of the users.

Figure 3:
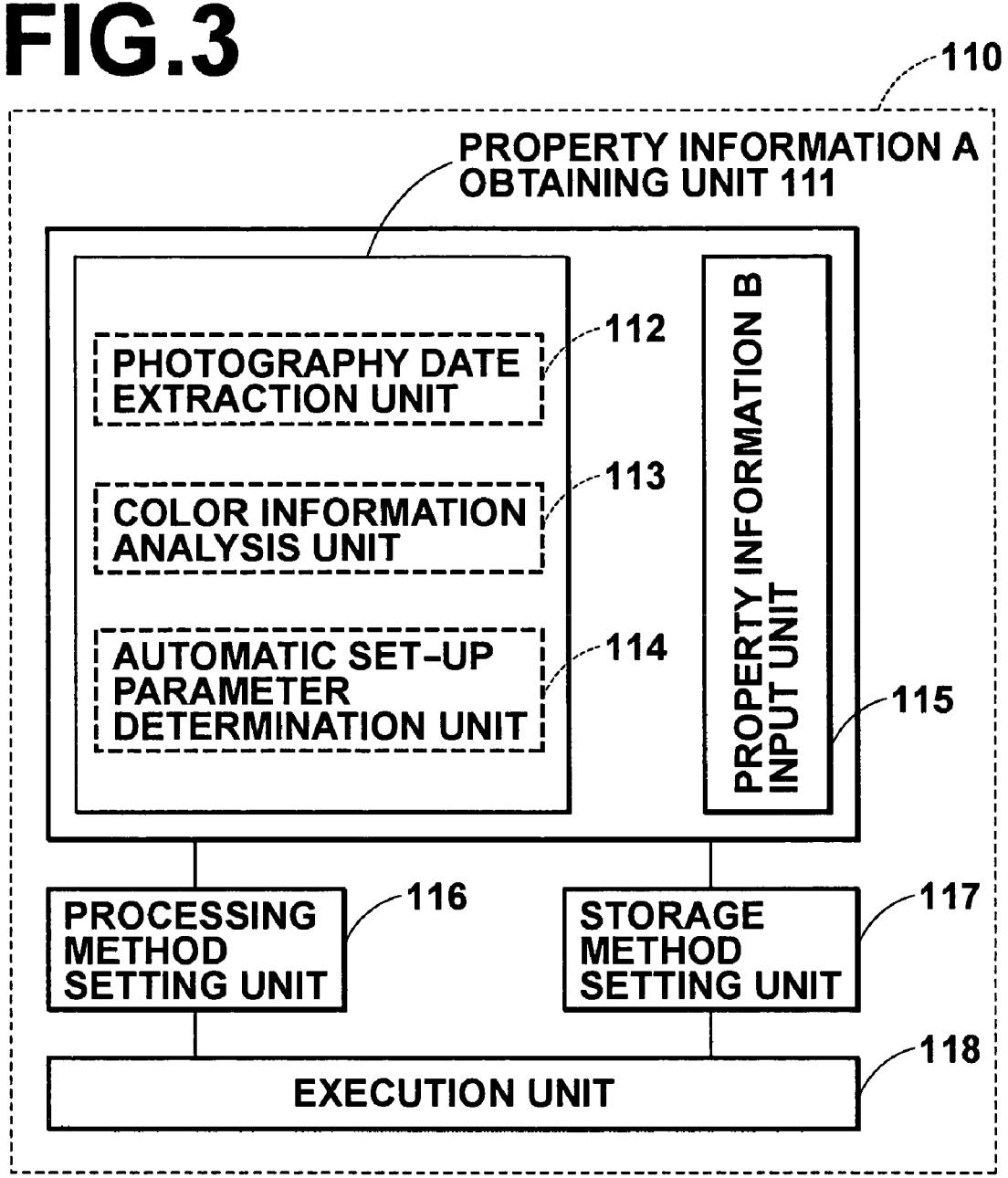
FIG. 3 is a block diagram showing a configuration of a property information processing unit 110 in the photo bank 100 shown in FIG. 2.

FIG. 3 is a block diagram showing a configuration of the property information processing unit 110 in the photo bank 100. As shown in FIG. 3, the property information processing unit 110 comprises a property information A obtaining unit 111 for extracting a portion of the items of the property information that can be extracted from the image data sets (hereinafter referred to as the property information A), a property information B input unit 115 for causing the owner to input the remaining item or items of the property information that cannot be extracted from the image data sets (hereinafter referred to as the property information B), a processing method setting unit 116 for causing the owner to select either no-processing or encryption as the security processing method for each of the items of the property information A and B, a storage method setting unit 117 for causing the owner to select either image attachment or database storage as the storage method for each of the items of the property information A and B, and an execution unit 118 for carrying out the security processing on the respective items of the property information according to the security processing method set by the processing method setting unit 116, and for causing the respective items of the property information after the security processing to be stored according to the storage method set by the storage method setting unit 117. More specifically, the execution unit 118 carries out the security processing on the image attachment items of the property information, and then outputs the image attachment items of the property information to the attachment unit 120. For the database storage items of the property information, the execution unit 118 carries out the security processing thereon, and then outputs the database storage items of the property information to the property information storage unit 128 in relation to the image ID of each of the corresponding image data sets. In this embodiment, the property information A has the items comprising the date of photography, color information, and a parameter of automatic set-up processing for image quality improvement. These items are obtained by a photography date extraction unit 112, a color information analysis unit 113, and an automatic set-up parameter determination unit 114. The property information B input by the owner has the items comprising the name of a photographer, subject information (the name of a subject in the case where the subject is a person), a photography location, and a comment. The processing method setting unit 116 respectively uses no-processing and encryption for the property information A and the property information B, as a default setting. Likewise, the storage method setting unit 117 respectively uses image attachment and database storage for the property information A and the property information B, as a default setting. In the case where the owner does not set the security processing method or the storage method, the default setting is adopted.

The attachment unit 120 attaches the image attachment items of the property information having been subjected to the security processing by the execution unit 118 to the corresponding image data sets, and outputs the image data sets attached with the image attachment items of the property information to the image data storage unit 125 where the image data sets are stored with the image ID of the corresponding image data sets.

In this embodiment, the image ID issuing unit 106 issues the image ID related to the name of the owner who uploaded the image data sets.

Figure 4:
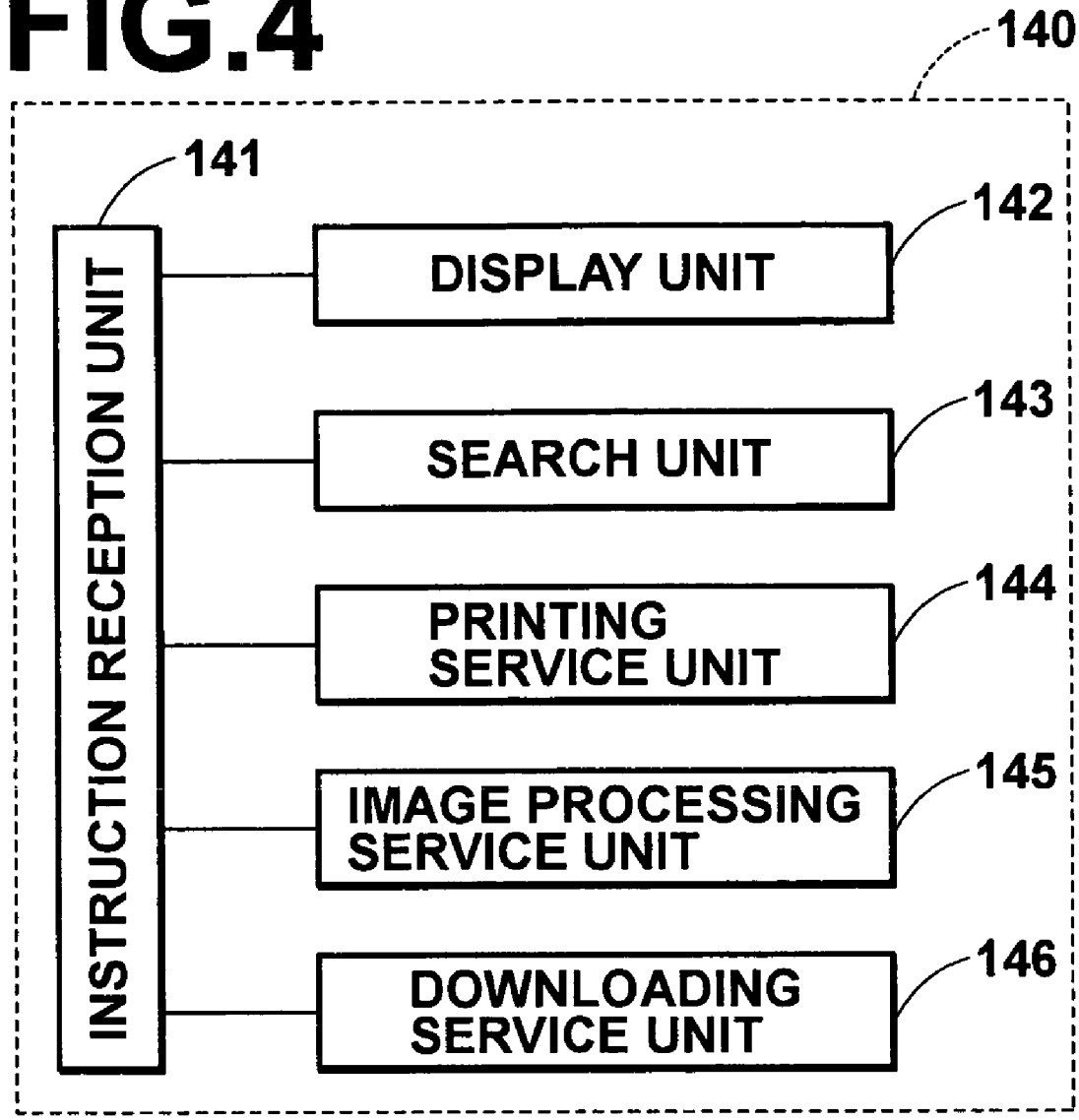
FIG. 4 is a block diagram showing a service provision unit 140 in the photo bank 100.

FIG. 4 is a block diagram showing a configuration of the service provision unit 140. In this embodiment, the photo bank 100 provides the services of five types comprising display, search, printing, image processing and downloading, regarding the image data sets. As shown in FIG. 4, the service provision unit 140 comprises an instruction reception unit 141, a display unit 142, a search unit 143, a printing service unit 144, an image processing service unit 145, and a downloading service unit 146. The instruction reception unit 141 receives an instruction from the user input via a Web interface (such as a Web page, buttons representing the services displayed in client application, or a displayed image), for specifying a desired one of the services, for image data selection, and for inputting a keyword used in a search. According to the instruction from the user, the display unit 142, the search unit 143, the printing service unit 144, the image processing service unit 144, or the downloading service unit 146 provides the corresponding one of the services such as display, image data search, printing, image processing, or downloading, regarding the image data sets and the property information. The services are provided regarding the image data sets to which the user has the access right (in the case of the services that need the property information stored in the property information storage unit 128, the services are provided only to the property information to which the user has the access right). The access right management unit 130 manages the access right, which will be explained later in detail.

The display unit 142 in the service provision unit 140 displays, as the photograph album, the image data sets to which the user has the access right. The search unit 143 carries out a search based on only the items of the property information to which the user has the access right, out of the image attachment items attached to the image data sets to which the user has the access right and the database storage items stored in the property information storage unit 128. The downloading service provision unit 146 sends a desired portion of the image data sets specified by the user (including the property information attached thereto) to the terminal of the user. The printing service unit 144 is used when a printing instruction is input (by clicking a Print button in a Web page, for example) from the user (the owner, actually) after the user selects a desired portion of the image data sets from the image data sets displayed by the display unit 142. When the instruction reception unit 141 receives the printing instruction regarding the selected image data set or sets, the printing service unit 144 inquires to the module directory server 60 (which will be explained later in detail) about the address (the URL address, in this case) of the print server 70 that carries out the printing service. The printing service unit 144 also sends the image data set or sets (with the image ID) to be printed to the print server 70, based on the URL address sent from the module directory server 60. The printing service unit 144 further causes the print server 70 to carry out printing processing by connecting the print server 70 to the terminal of the user. As will be explained later, the printing service unit 144 has an addressee management unit that is not shown, for generating data regarding an addressee of a print or prints (hereinafter referred to as the prints) generated by the print server 70 and for sending the data to the print server 70 together with the image ID of each of the image data sets to be printed.

The image processing service unit 145 in the service provision unit 140 is used when the user (actually, the owner) instructs image processing (by clicking an Image Processing button in a Web page, for example) after selection of a desired portion of the image data sets from the image data sets displayed by the display unit 142. When the instruction reception unit 141 receives the image processing instruction regarding the selected image data set or sets, the image processing service unit 145 inquires to the module directory server 60 about the address (the URL address, in this case) of the image processing server 80 that carries out the image processing service. The image processing service unit 145 then sends the image data set or sets (with the image ID) to be processed to the image processing server 80, based on the URL address sent from the module directory server 60. The image processing service unit 145 also causes the image processing server 80 to carry out the image processing, by connecting the image processing server 80 to the terminal of the user.

In other words, the printing service unit 144 or the image processing service unit 145 in the service provision unit 140 does not actually carry out the printing service or the image processing service, but acts as an interface between the terminal and the print server 70 or the image processing server 80 in the case where the printing or the image processing is instructed from the terminal.

Figure 5:
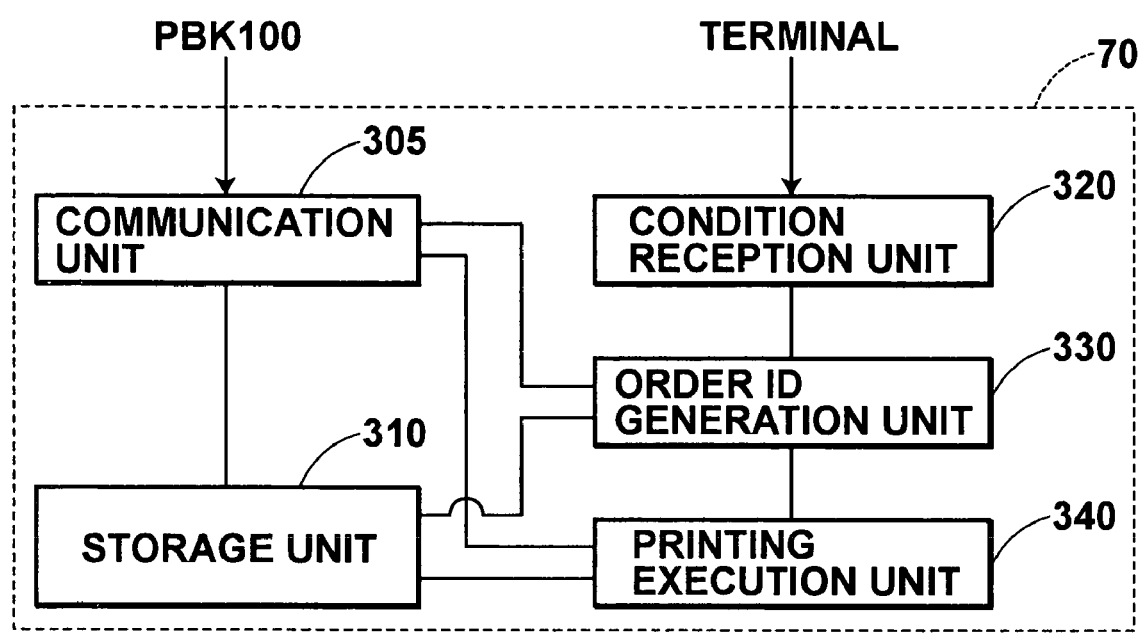
FIG. 5 is a block diagram showing a configuration of a print server 70 in the photograph image service system shown in FIG. 1.

The print server 70 receives the selected image data set or sets (with the image ID in the explanation below) and is connected to the terminal when the user instructs the printing after selection of the image data set or sets via the terminal. The print server 70 is connected to a plurality of mini-laboratories via the Internet 50, which is not shown. The print server 70 causes a printing apparatus in one of the mini-laboratories to carry out the printing processing by sending the image data set or sets thereto. FIG. 5 is a block diagram showing a configuration of the print server 70. As shown in FIG. 5, the print server 70 comprises a communication unit 305, a storage unit 310, a condition reception unit 320, an order ID generation unit 330, and a printing execution unit 340. The communication unit 305 is used for communication with the photo bank 100. The storage unit 310 stores the image data set or sets sent from the photo bank 100 via the communication unit 305. Upon connection to the terminal, the condition reception unit 320 receives printing conditions (such as a print reception method representing mailing or reception at a store, a store at which the prints are received in the case of reception at the store, a print size, and a print quantity) set by the user via the terminal. The order ID generation unit 330 generates an order ID related to the image ID in the case where the printing conditions have been set and a printing order has been confirmed, and notifies the user of the order ID via the terminal. The order ID generation unit 330 also sends the order ID to the printing service unit 144 of the photo bank 100 in the case where the condition reception unit 320 receives "mailing" as the print reception method. The printing execution unit 340 causes the printing apparatus of the corresponding one of the mini-laboratories to carry out the printing processing, by sending thereto the image data set or sets to be printed, the printing conditions, and the image ID, together with the data of the addressee corresponding to the order ID. As has been described above, the data are sent from the addressee management unit of the printing service unit 144 via the communication unit 305. The corresponding mini-laboratory is a mini-laboratory specified by the user in the case where the user specifies "reception at a store" as the reception method via the condition reception unit 320. Alternatively, the laboratory is a laboratory geographically closest to the addressee that is found according to the data of the addressee sent from the printing service unit 144.

The printing apparatus in each of the mini-laboratories can carry out printing regarding the image data set or sets sent from the print server 70 according to the printing conditions such as the quantity, the size, and the type of printing paper. In the case where mailing has been specified as the reception method, the prints are mailed to the addressee represented by the data corresponding to the order ID. In the case of reception at a store, the prints are stored at the mini-laboratory that carried out printing until the user comes to receive the prints.

The operation of the addressee management unit of the printing service unit 144 that generates the data of the addressee will be explained below. The addressee management unit analyzes information of the image ID included in the order ID when the addressee management unit receives the order ID from the print server 70. The addressee management unit reads customer information on the user (the owner) from the customer information database 135, based on the name of the owner of the image data sets corresponding to the image ID. According to the customer information, the addressee management unit generates the data of the addressee, and sends the data in relation to the order ID to the print server 70.

The image processing server 80 receives the selected image data set or sets (with the image ID in the explanation below) and is connected to the terminal when the user instructs image processing via the terminal after selection of the image data set or sets. If the user selects a desired type of image processing (such as generation of a portrait of a subject person or composite image generation with a template) from an image processing menu provided by the image processing server 80 via the terminal, the image processing server 80 carries out the selected type of image processing on the image data set or sets and sends the image data set or sets to the terminal after the image processing.

As is obvious from the above explanation of the service provision unit 140 in the photo bank 100, the service provision unit 140 provides the services corresponding to the access right owned by the user. Management of the access right itself is carried out by the access right management unit 130 of the photo bank 100.

The access right management unit 130 grants the owner who uploaded the image data sets stored in the image data storage unit 125 a full access right to the image data sets (the right to receive all the services comprising display, search, printing, image processing, and downloading) and to the property information stored in the property information storage unit 128 in relation to the image ID. The access right management unit 130 further grants an access right (not the full access right) to a user to whom the owner of the image data sets the access right. The access right management unit 130 has an access right setting unit which is not shown, and the owner of the image data sets can grant the user who is not the owner the access right to the photograph album (the image data sets), by using the access right setting unit. More specifically, when the owner instructs access right setting (by clicking a Set Access Right button in a Web page, for example) via a Web interface provided by the photo bank 100, the access right setting unit sends the name of the owner to the personal album directory server 90 and connects the terminal of the owner to the personal album directory server 90. In this manner, the access right setting unit causes the personal album directory server 90 to carry out access right setting processing. The owner can register the name of the user to whom the access right to the personal album is granted, via a Web interface provided by the personal album directory server 90. The access right management unit 130 grants the access right to the user whose name has been registered with the personal album directory server 90 by the owner. In this manner, the owner of the image data sets can share photograph images represented by the image data sets with his/her friends or the like. However, the access right management unit 130 grants the full access right only to the owner, and grants the access right for viewing (display), search, and downloading (hereinafter referred to as the limited access right) to the user whose name has been registered with the personal album directory server 90 by the owner.

The operation of the personal album directory server 90 will be explained next. The personal album directory server 90 receives the name of the owner and is connected to the terminal of the owner, when the owner instructs access right setting by using the access right setting unit for inputting the name of the user to whom the owner wishes to grant the limited access right. The personal album directory server 90 comprises an access right registration unit and a storage unit that are not shown. The access right registration unit receives the input of the name of the user from the owner, and stores the name of the user in the storage unit to be provided in response to an inquiry from the access right management unit 130.

The access right management unit 130 inquires to the personal album directory server 90 about the access right in response to access from the user or the owner, and obtains information on the photograph album that the user or the owner can access.

The module directory server 60 has the addresses of the print server 70 and the image processing server 80, and sends the address of the corresponding server (either the print server 70 or the image processing server 80) to the service provision unit 140 upon an inquiry from the service provision unit 140.

Figure 6A:
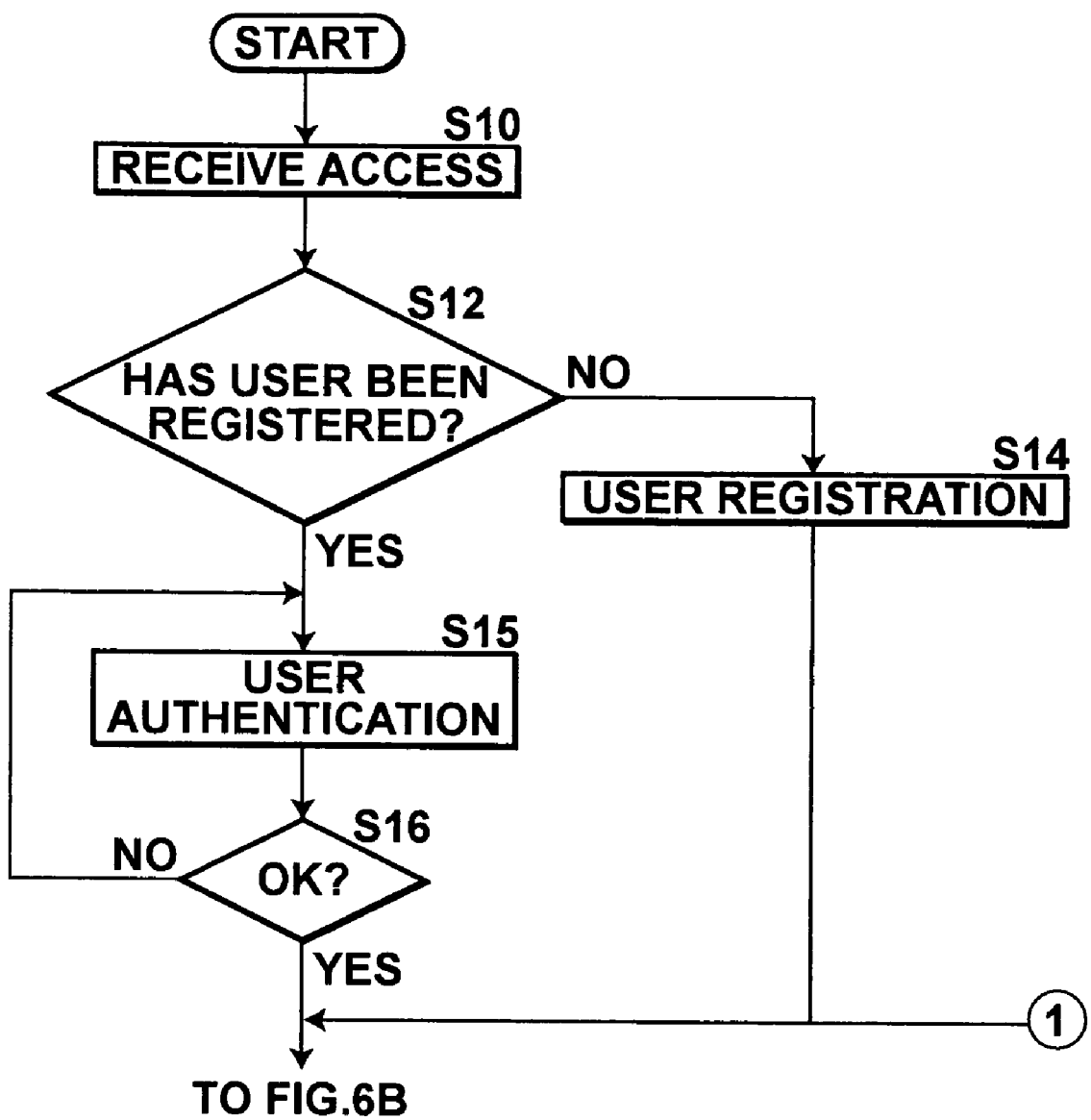
Figure 6C:
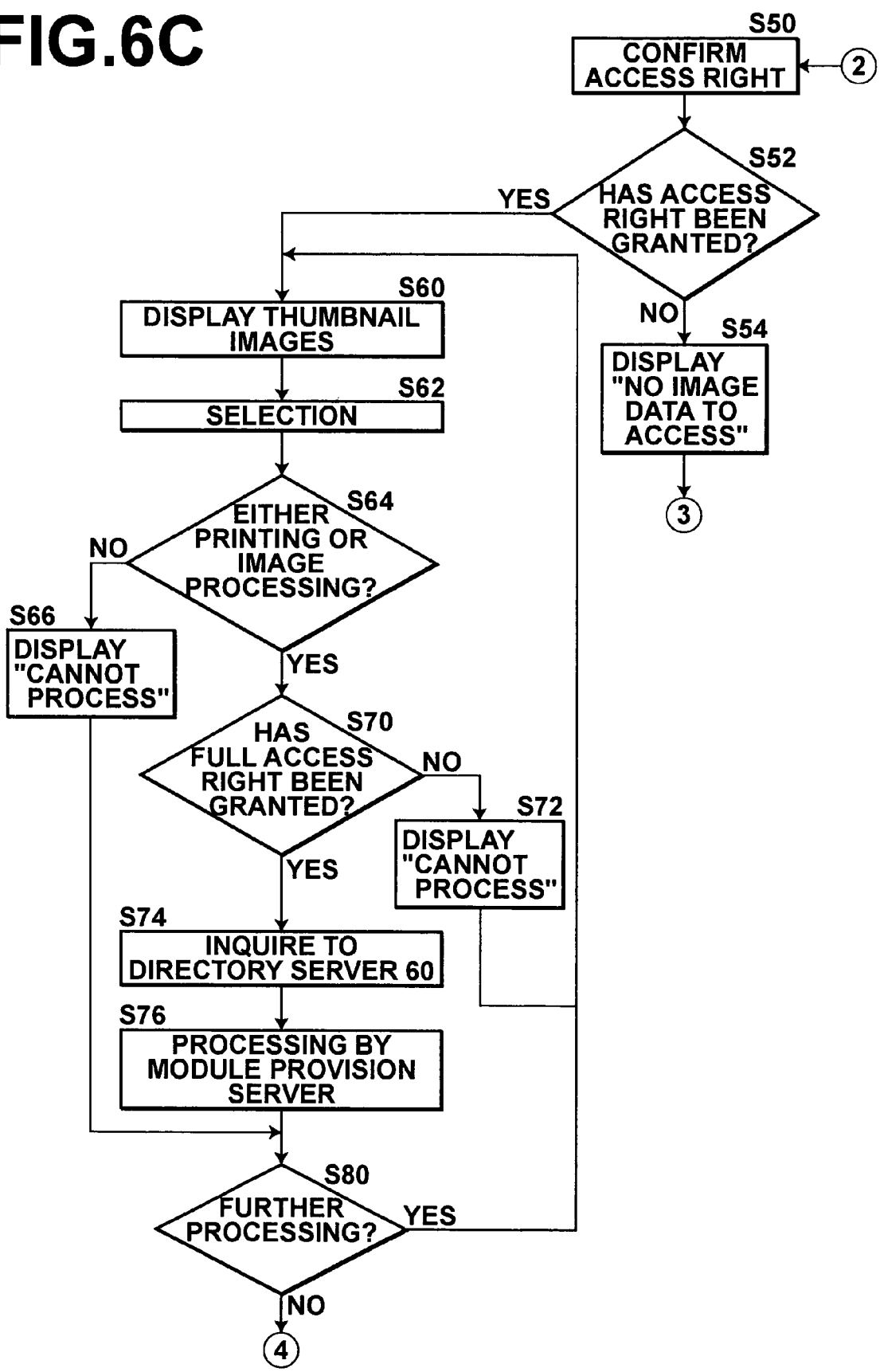

FIG. 6A, FIG. 6B and FIG. 6C a flowchart illustrating the operation of the photo bank 100 in the photograph service system shown in FIG. 1. The photo bank 100 receives the access from the user terminal by using the access reception unit 102 via the Internet 50 (Step S10), and confirms whether or not the access is from the user whose user registration has been completed (Step S12). In the case where user registration has not been carried out by the user, (Step S12: No), the photo bank 100 prompts the user to register himself/herself by inputting the name, the password, the address, and the like (Step S14). In the case where the access is from the user whose user registration has been completed, user authentication is carried out by prompting the user to input the name and the password (Step S15). In the case where the user name and the password have been input correctly (Step S16: Yes) or the user has registered himself/herself (Step S14), whether or not the access is for uploading the image data sets is judged (Step S18). If a result of the judgment is affirmative (Step S18: Yes), the photo bank 100 receives the image data sets (Step S20), and the image ID issuing unit 106 gives the image ID to each of the image data sets (Step S22). The image ID includes the information on the name of the user as the owner who sent the image data sets. The property information A obtaining unit in the property information processing unit 110 analyzes the image data sets having the image ID, and obtains the property information A comprising the items of the photography date, the color information, and the automatic set-up processing parameter. At the same time, the property information B inputting unit causes the user (the owner) to input the property information B comprising the items of the photographer name, the subject information (the name of the subject if the subject is a person), the photography location, and the comment (Step S24). The processing method setting unit 116 and the storage method setting unit 117 cause the owner to select the security processing method (either no-processing or encryption) and the storage method (either image attachment or database storage, for each of the items of the property information (Step S26). The execution unit 118 carries out the security processing on each of the items of the property information according to the security processing method that has been set (Step S28). Whether or not the storage method is image attachment is then judged for each of the items of the property information having been subjected to the security processing (Step S30). If a result at Step S30 is affirmative (Step S30: Yes), the attachment unit 120 attaches the image attachment items of the property information to the corresponding image data sets (Step S32), and stores the image data sets attached with the image attachment items of the property information in the image data storage unit 125 (Step S34). If the result at Step S30 is negative (Step S30: No), which indicates that the storage method is database storage, the property information storage unit 128 stores the database storage items of the property information having been subjected to the security processing, in relation to the corresponding image ID (Step S36). If no further processing is carried out (Step S56: No), the photo bank 100 carries out log-off processing for the user to end the operation. If further processing is carried out (Step S56: Yes), the process returns to Step S18.

If the owner does not set the methods at Step S26, the default security processing method and the default storage method (that is, no-processing and image attachment for the property information A, and encryption and database storage for the property information B) are adopted.

In the case where the access is not for image uploading (Step S18: No) but for registration of the user who can access the image data sets of the owner accessing the photo bank 100 for enabling disclosure of the photograph album to the user (Step S40: Yes), the access right management unit 130 in the photo bank 100 causes the personal album directory server 90 to carry out the registration by sending the owner name to the personal album directory server 90 and by connecting the personal album directory server 90 to the terminal of the owner (Step S42). If the owner does not carry out further processing (Step S56: No) after the owner inputs the name of the user to whom the photograph album is disclosed and accesses the photo bank 100 again (by clicking a Go Back button in a Web page of the personal album directory server 90, for example), the photo bank 100 carries out the log-off processing for the owner to end the operation. If the owner carries out further processing (Step S56: Yes), the process returns to Step S18.

In the case where the access is not for uploading (Step S18: No) but for receiving the services provided by the service provision unit 140 (Step S40: No), the access right management unit 130 confirms the access right of the user (Step S50). More specifically, the access right management unit 130 confirms whether or not the user has specified the image data sets to which the user has the full access right, and whether or not the user has specified the image data sets to which the user has the limited access right. Whether or not the user has specified the image data sets to which the user has the limited access right can be confirmed through an inquiry to the personal album directory server 90.

In the case where the user has not specified the image data sets to which the user has the access right (Step S52: Yes) indicating that the user has not specified the image data sets of his/her own or the image data sets to which the user has the limited access right granted by the owner of the image data sets, the access right management unit 130 displays a message reading "No Image Data to Access" (Step S54) to prompt the user to carry out other processing. If the user does not carry out any other processing (Step S56: No), the photo bank 100 carries out the log-off processing for the user to end the operation. If the user caries out other processing (Step S56: Yes), the process returns to Step S18.

In the case where the user has been judged to have specified the image data sets to which the user has the access right (either the full access right or the limited access right granted by the owner of the image data sets) at Step S52 (Step S52: Yes), the service provision unit 140 displays the image data sets in the form of thumbnail images (Step S60). If the user selects a desired portion of the thumbnail images (Step S62), and instructs service provision to the service provision unit 140, the service provision unit 140 provides the services corresponding to the access right of the user (Steps S64-S80). More specifically, in the case where the service instruction from the user is for printing or image processing (Step S64: Yes), the service provision unit 140 confirms whether or not the user has the full access right to the selected image data set or sets (that is, whether or not the image data sets are owned by the user) through an inquiry to the access right management unit 130. In the case where the user does not have the full access right to the selected image data set or sets (Step S70: No), the service provision unit 140 displays a message "Cannot Process" to prompt the user to carry out other processing (Step S72). If the user does not carry out any other processing (Step S80: No), the photo bank 100 carries out the log-off processing for the user to end the operation. If the user carries out other processing (Step S80: Yes), the process returns to Step S60.

In the case where the user has the full access right to the selected image data sets (Step S70: Yes), a corresponding one of the service units in the service provision unit 140 (that is, either the printing service unit 144 or the image processing service unit 145) inquires to the module directory server 60 about the address of either the print server 70 or the image processing server 80 corresponding to the instructed service (Step S74). The service provision unit sends the selected image data set or sets (with the image ID) to the address of the module provision server, and connects the terminal of the user (the owner) to the module provision server to cause the server to carry out the printing processing or the image processing (Step S76). In the case where the user is connected to the photo bank 100 but does not carry out other processing after the module provision server carries out the processing (Step S80: No), the photo bank 100 carries out the log-off processing for the user to end the operation. If the user carries out further processing (Step S80: Yes), the process returns to Step S60.

In the case where the service instruction input by the user is for display, or search, or downloading (Step S64: No), the corresponding service unit in the service provision unit 140 (the display unit 142, or the search unit 143, or the downloading service unit 146) carries out the instructed processing on the selected image data set or sets (Step S66). If the user does not instruct another one of the services after the processing (Step S80: No), the photo bank 100 carries out the log-off processing for the user to end the operation. If the user instructs another one of the services (Step S80: Yes), the process returns to Step S60.

The search unit 143 in the service provision unit 140 prompts the user to input the search keyword in response to the search instruction by the user. Based on the keyword, the search unit 143 searches the property information to which the user has the access right, and reads the corresponding image data set or sets for display on the terminal. In the case where the image data sets are the image data sets to which the user has the full access right, the search unit 143 searches the image attachment items of the property information attached to the image data sets in the image data storage unit 125 and the database storage items of the property information stored in the property information storage unit 128. In the case of the image data sets are those to which the user does not have the full access right, the search unit 143 searches only the image attachment items of the property information.

As has been described above, according to the photograph image service system shown in FIG. 1, the photo bank 100 as the embodiment of the image data management apparatus of the present invention causes the owner to set the security processing method and the storage method for each of the items of the property information of each of the image data sets, and the security processing as well as the storage processing is carried out according to the methods that have been set. Therefore, if the owner specifies encryption for some of the items of the property information which are not to be disclosed, the user who is not the owner but downloads the image data sets attached with the items of the property information cannot refer to the items of the property information without specific application software. In this manner, high security can be realized. In addition, the database storage items of the property information stored in the property information storage unit 128 are not disclosed to any other users. Therefore, upon a search, the owner can view the database storage items of the property information stored in the property information storage unit 128 in addition to the image attachment items of the property information attached to the image data sets in the image data storage unit 125, while security can also be improved.

The database storage items of the property information stored in the property information storage unit 128 are not downloaded along with the image data sets, although the database storage items of the property information comprise the property information of the image data sets. Therefore, the user who downloads the image data sets can shorten the time for downloading, which is beneficial for the user.

The photograph image service system causes the personal album directory server 90 to set and manage the access right (not the full access right) to the image data sets managed by the photo bank 100. Therefore, the photo bank 100 can be less burdened.

The printing service and the image processing service are carried out by the print server 70 and the image processing server 80. In this manner, the photo bank 100 can reduce an operation load thereof. At the same time, the image data management service, the printing service, and the image processing service can be carried out by different service providers, and the configuration of each of the servers can be simple.

Since the address of the server to provide the printing service or the image processing service is managed by the module directory server 60, it is beneficial for the photo bank 100 that the photo bank 100 does not need to carry out processing for changing the server even in the case where the server to provide the printing service or the image processing service is changed.

Although the preferred embodiment of the image data management apparatus of the present invention has been explained, the present invention is not limited to the embodiment described above, and various modifications can be made thereto within the scope of the present invention.

For example, in the above embodiment, each of the servers is located independently. However, those servers may be united in any arbitrary combination. Alternatively, one apparatus in a system may realize all the functions of those servers.

In the embodiment describe above, the photograph image data sets are to be managed. However, the image data management apparatus of the present invention may manage any image data sets.

In the embodiment described above, the property information storage unit 128 is installed in the photo bank 100 together with the image data storage unit 125. However, the property information storage unit 128 may be located at any place that is connectable to the photo bank 100 via the network, instead of being installed in the photo bank 100. In this manner, the photo bank 100 can be less burdened. Moreover, a plurality of property information storage units may be used.

In the above embodiment, only the owner of the image data sets can view the database storage items of the property information stored in the property information storage unit 128. However, the access right thereto may be granted to another user specified by the owner.

The type of the access right may also be set in more detail.

In the above embodiment, only no processing and encryption are available as the security processing methods. However, another security processing method such as electronic watermark processing may be adopted.

The terminals are not necessarily limited to the cellular phone 10 and the personal computers 20 and 30, but any terminal such as an Internet-connectable TV set or phone or game machine can be used.

What is claimed is:

1. An image data management apparatus comprising:
property information obtaining means for obtaining property information items of an image data set to be managed;
security processing method setting means for setting either no security processing or a specific security processing method for each of the items of the property information obtained from the property information obtaining means;
security processing means for carrying out the specific security processing method on each of the items of the property information for which the security processing method has been set by the security processing method setting means;
attachment decision means for deciding that first ones of the items of the property information are to be attached to the image data set;
attachment means for attaching the first ones of the items of the property information decided by the attachment decision means to the image data set;
image data storage means for storing the image data set attached with the first ones of the items of the property information by the attachment means; and
property information storage means for storing remaining items of the property information not attached to the image data set by the attachment means in a manner to permit access thereof with a corresponding image data set with attached property information, wherein
said property information obtaining means includes at least one of image analysis means for obtaining the property information of the image data set by analyzing the image data set and input means for inputting items constituting the property information, the input means being used by a user to input the items of the property information.

2. The image data management apparatus as defined in claim 1, wherein the specific security processing method that can be set by the security processing method setting means refers to encryption processing, or electronic watermark processing.

3. The image data management apparatus as defined in claim 1, wherein the image data storage means and the property information storage means are connected to each other via a network.

4. The image data management apparatus as defined in any one of claims 1, 2, and 3, wherein the property information includes an item representing a parameter of image processing to be carried out on the image data set.

* * * * *